Oct. 9, 1962 N. GOLD 3,057,078
APPARATUS FOR CURING MOIST DENTAL RESTORATION MOLDS
Filed Dec. 15, 1959 3 Sheets-Sheet 2
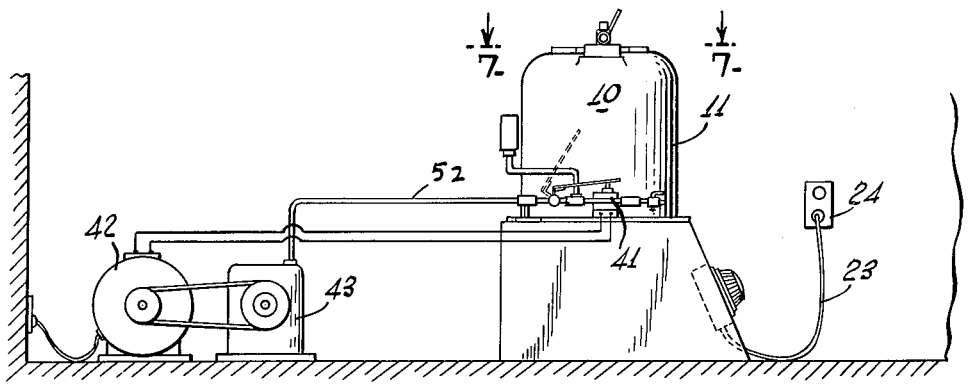
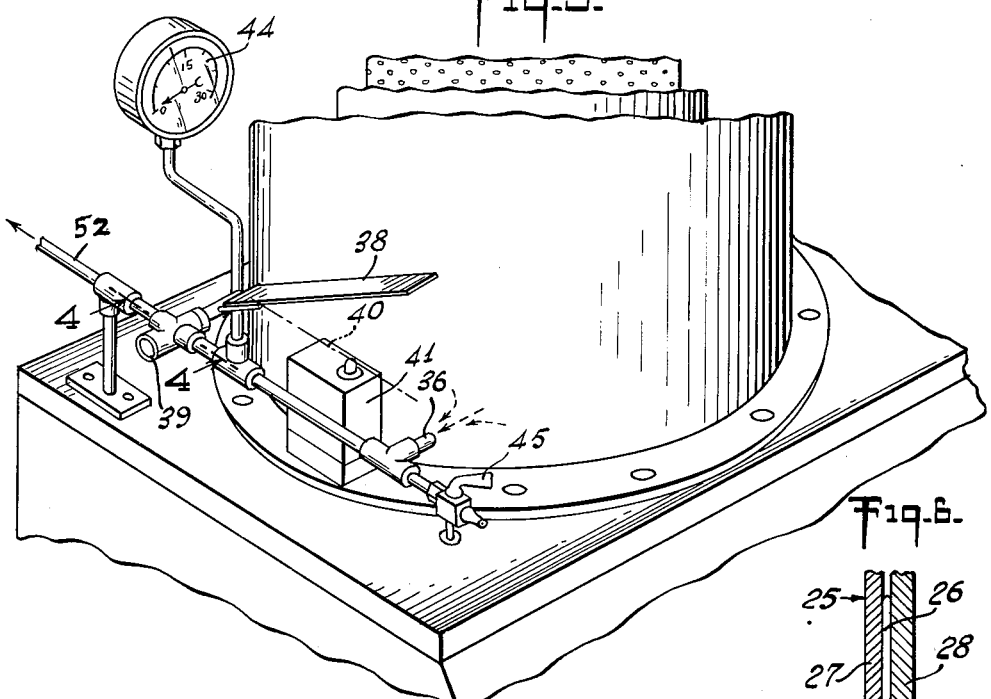
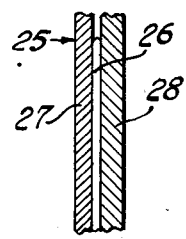
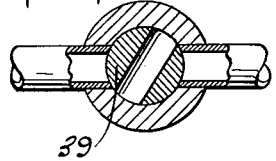
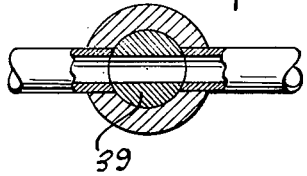
INVENTOR
N. GOLD
BY
ATTORNEY Oct. 9, 1962 N. GOLD 3,057,078
APPARATUS FOR CURING MOIST DENTAL RESTORATION MOLDS
Filed Dec. 15, 1959 3 Sheets-Sheet 3
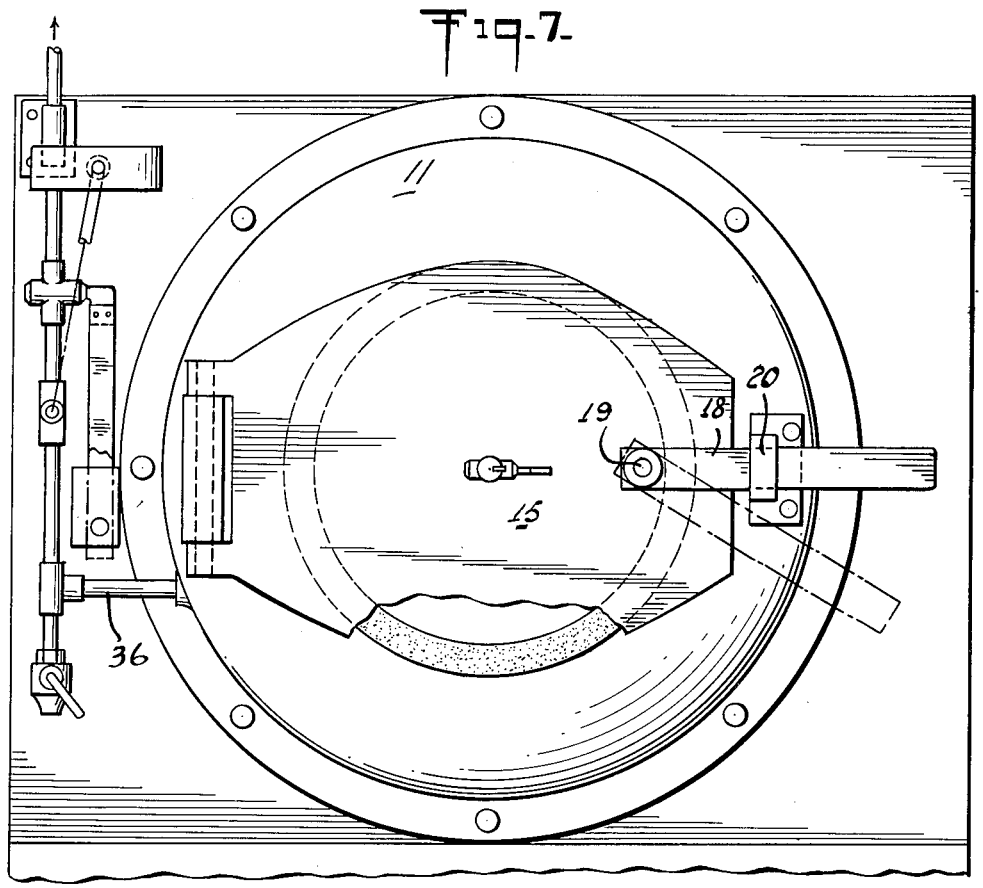
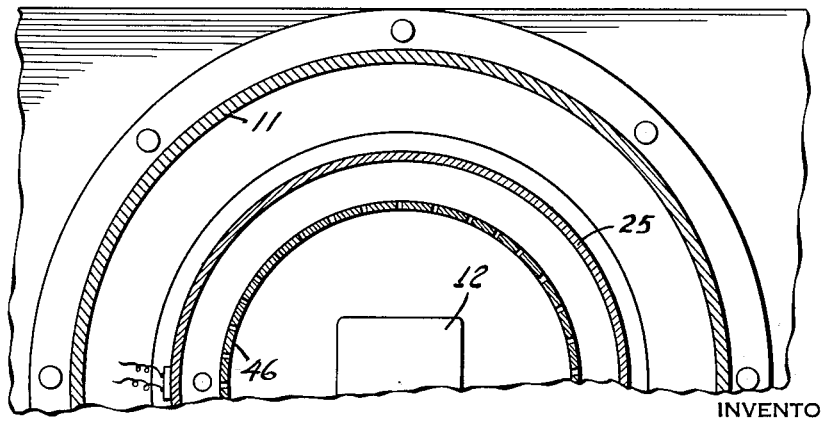
INVENTOR
N GOLD
BY
ATTORNEY

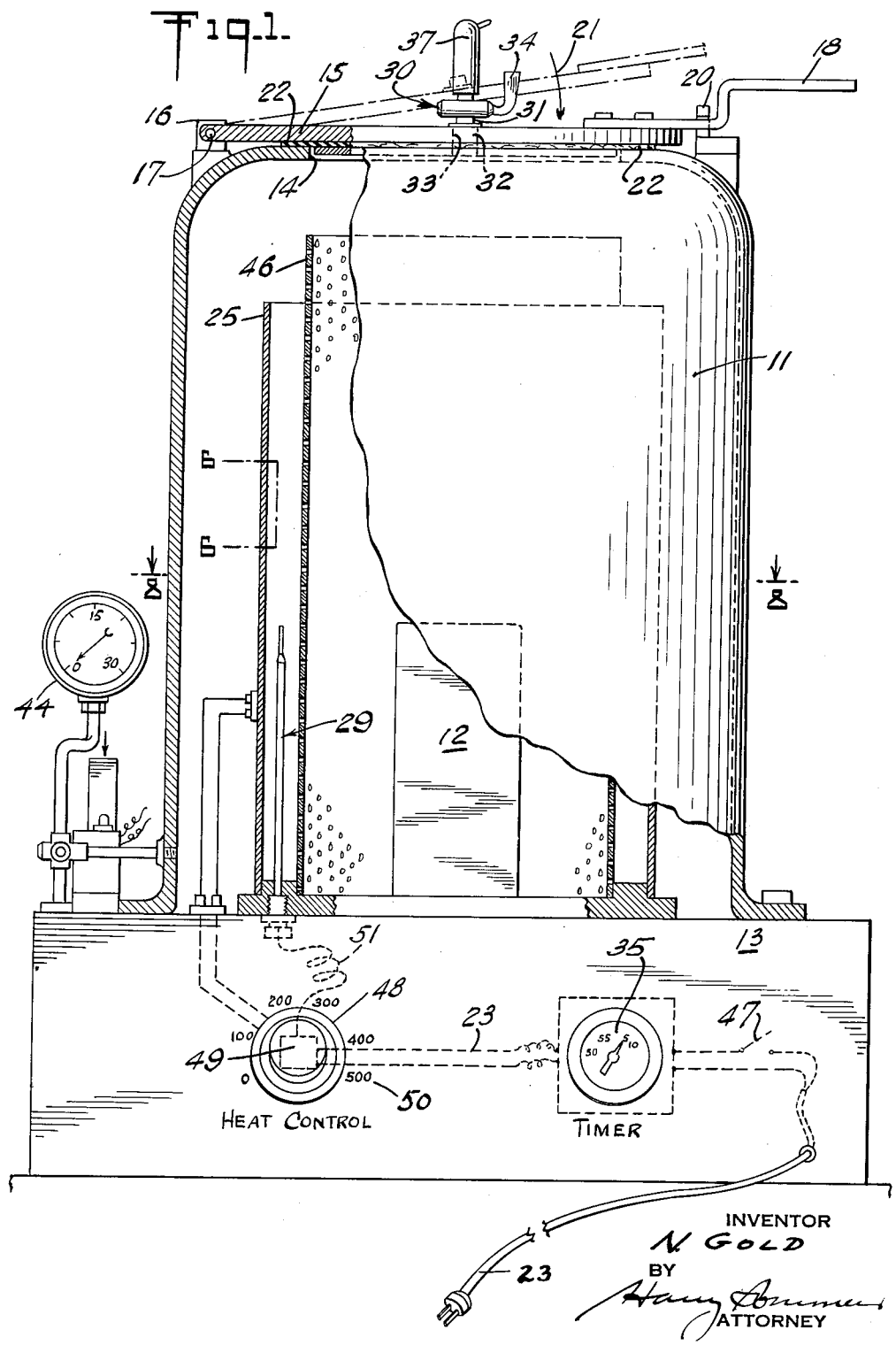

United States Patent Office 3,057,078
Patented Oct. 9, 1962

3,057,078
APPARATUS FOR CURING MOIST DENTAL RESTORATION MOLDS
Nat Gold, Newark, N.J., assignor to Nu-Dent Porcelain Studio Inc., New York, N.Y., a corporation of New York
Filed Dec. 15, 1959, Ser. No. 859,743
7 Claims. (Cl. 34—48)

This invention relates to an apparatus especially designed for use in dental laboratories for the curing of moist plastic dental restoration structures. Heretofore, the curing of moist dental restoration structures, intended for use with acrylic or like restorations, has required immersion of the restoration structures in boiling water, a very time consuming, awkward, inaccurate, hazardous procedure, without uniformity of results.

Pursuant to the present invention, dental restorations are cured in a precise, accurate and convenient manner assuring uniformity of results and a high degree of safety in use. The invention, including an apparatus and method for achieving the foregoing objectives, is exemplified in the accompanying drawings, wherein similar reference characters indicate like parts, and wherein:

FIG. 1 is a vertical elevational, partly sectional view of an apparatus embodying the invention, FIG. 2 is a side elevational view of said apparatus shown connected to a pump and current supply source, FIG. 3 is a fragmentary, perspective view of the apparatus, FIG. 4 is an enlarged fragmentary sectional view of an air exhaust valve therefor, FIG. 5 is a similar view showing said valve moved to another position, FIG. 6 is an enlarged, vertical sectional view of heating member 25, taken at line 6—6 of FIG. 1, FIG. 7 is an enlarged partly sectional, top plan view of the casing and associated parts of the structure, taken at line 7—7 of FIG. 2, and FIG. 8 is a similar view taken at line 8—8 of FIG. 1.

In the drawings, wherein similar reference characters indicate like parts, the apparatus of the invention is exemplified as including casing 11 wherein the moist plastic dental restoration structure 12 is cured in dry heat and under vacuum. The restoration structure 12 (FIG. 1) may, for example, be mold halves in which the restorations are positioned, the mold halves being clamped together to hold the restorations firmly in place during the curing cycle. The casing 11 has a base section 13 to which the lower end of the casing is secured in air tight relation and an opening 14 at the top thereof (FIG. 1) cover 15 being closed in air tight relation on the top of the casing to seal the opening 14 therein in any suitable or convenient arrangement as, for example, by pivoting one end of cover 15 to a bearing 16 on the casing as at 17 and movably connecting as at 19 (FIG. 7) a latch bar 18 to the cover for engagement with a complementary latch bracket 20 on the casing, the lever 18 being manually moved selectively into engagement with the bracket (FIGS. 1 and 7 full lines) or clear thereof (FIG. 7 dotted lines) to thereby enable the cover to be securely held closed (arrow 21, FIG. 1), or in open (dotted line) position FIG. 1. A gasket 22 may be provided at the top of the casing 11 and surrounding the opening 14 therein intermediate said casing and cover 15, against which the cover may be closed, to assist in sealing the opening 14 from the ambient atmosphere.

Means are provided for heating the casing interiorly, including a cable 23 for connection of a power source 24 with a heating member 25 within the casing; member 25 may (FIG. 6) comprise a resistance coil or wire 26 pressed between concentric stainless steel tubes 27, 28 and forming an essentially unitary heating tube 25 therewith. Thermostatic means 29 may be disposed interiorly of the casing (FIG. 1) to open the circuit through the cable when the temperature within the casing reaches a predetermined value.

In operation, the dental restoration structure 12 is positioned within the casing 11 and the cover 15 is closed and heating means 25 turned on by connection with the power source 24. Initially the moisture content of structure 12 is driven off and discharged into the surrounding atmosphere through air vent valve means 30 (FIG. 1) at the top of casing 11 (in cover 15); said means 30 may include a manually actuated valve 31 having a stem 32 seated within a valve opening 33 in the cover 15, the valve being opened on rotation of handle 34 thereof when the dental restoration structure 12 has been heated sufficiently to drive off the moisture content thereof. A timer 35 may be cut into the cable 23 to control the heating time to that desired initially to drive off the moisture content of the dental restoration structure 12 and thereafter to complete the curing cycle. At the termination of the steam vent time period the valve 30 may be opened to relieve the pressure of the moisture-laden air which is thus exhausted into the surrounding atmosphere, after which the valve may be closed and the air within the casing 11 exhausted (through exhaust valve means 39) with continued heating of casing 11 interiorly. If desired, the air discharge valve 31 may include an automatic steam escape valve 37 of the type, for example, such as conventionally provided for steam radiators, for automatic exhaustion of steam generated within the casing 11.

Air within the casing 11 may be exhausted on completion of the steam discharge cycle by lever 38 (FIG. 3) of the exhaust valve means 39. The latter may be a two way valve with an L-shaped opening (rather than the schematic straight opening shown in the drawing) to connect casing pipe 36 with exhaust pipe 52 of pump 43 (FIGS. 2 and 3) when the handle 38 is in one position or selectively with the air admission valve 45 in the other position or for closing the pipe 36 (FIG. 4) in intermediate position. In the "down" position handle 38 may actuate a switch 41 such as a button actuated mercury switch to energize the motor 42 for the vacuum pump 43 (FIG. 2). A gauge 44 may be provided to indicate the vacuum condition within the casing 11.

At the conclusion of the (steam exhaust and vacuum heating cycles) the operator opens air admission valve 45 so that air from the atmosphere may enter the casing 11 to replace the air previously exhausted therefrom so that cover 15 may be opened and the dental restoration structure 12 removed and replaced by another and the operation cycles above described repeated.

A heat diffusion screen or tube 46 of greater length than the heating member 25 may be positioned interiorly of the heating member to provide a safety factor on the insertion and removal of the dental restoration structure; the user thus will be protected from direct accidental contact with the heating member 25 at all times. An on-off switch 47 may be provided in the cable 23 in advance of the timer 35. A heat control member 48 may be provided, with a knob 49 or other pointer to be set by the operator relative to a temperature scale 50. Thermostat 29 may be of any desired type, for example, a member connected with the heat means member 48 as at 51 to thereby cut off the current when temperature within the casing 11 attains the predetermined point to which the knob 49 has been set.

The invention is not limited to the forms shown in the drawings and described above but includes all other forms which may be made pursuant to the disclosure herein.

Having thus described my invention, what I claim as new and desire to secure by Letters Patent is:

1. An apparatus for curing moist plastic dental restoration structures comprising an upright generally cylindrical casing, a base section secured to and closing the lower end of said casing, said casing having an opening in the upper end thereof, a cover pivotally secured to said apparatus and swingable into a closed position overlying said opening, means engaging the cover and casing for holding the cover in airtight relation on the casing when in said closed position, said cover having an opening therein, a moist air venting valve fitted into said cover opening and extending therefrom exteriorly of the cover, said moist air venting valve including actuating means for moving said moist air venting valve to open or closed position to selectively connect or disconnect the interior of the casing with the ambient atmosphere, a tubular heating means disposed within said generally cylindrical casing, an air exhaust means having one end thereof extended into said casing, and valve means in said air exhaust means for selectively connecting and disconnecting said air exhaust means and the interior of said casing and for connecting the casing with the ambient atmosphere, whereby a moist dental restoration structure may be positioned within the casing, the latter heated to convert the moisture within the restoration structure to steam, which steam may be discharged from the casing upon operation of the actuating means for said moist air venting valve to open position, upon completion of such exhaustion of the steam, said air venting valve may be moved to closed position to seal the casing, and the air exhaust means connected with the casing for exhausting the interior thereof while continuing to heat the casing, to thereby further heat and cure the dental restoration structure.

2. In an apparatus as set forth in claim 1, thermostatic means within the casing for disconnecting said tubular heating means when the temperature within the casing reaches a predetermined point.

3. In an apparatus as set forth in claim 1, a tubular screen positioned within the casing interiorly of the tubular heating means.

4. In an apparatus as set forth in claim 1, a steam escape valve secured to the moist air venting valve.

5. In an apparatus as set forth in claim 1, the means engaging the cover and casing including a gasket positioned intermediate the cover and casing and latch means on the cover and casing for holding the cover on the casing when said cover is in closed position.

6. In an apparatus as set forth in claim 1, said tubular heating means comprising a heating element electrically secured to a tube positioned within the casing and resting on the base section thereof, a cable for connecting said heating element with a power source, and heat control means connected with the cable, said heat control means including a thermostat positioned interiorly of the casing and actuated by the temperature therein, said thermostat being connected to the cable to thereby discontinue the flow of current when the temperature within the casing reaches a predetermined point.

7. In a device as set forth in claim 1, a heat diffusion tube disposed within the casing interiorly of the tubular heating means and in spaced relation thereto and extending above the top of the heating means.

References Cited in the file of this patent

UNITED STATES PATENTS

| | | |
|---|---|---|
| 365,083 | Mann | June 21, 1887 |
| 690,592 | Lapp | Jan. 7, 1902 |
| 1,086,950 | Stanton | Feb. 10, 1914 |
| 1,152,964 | Nielsen | Sept. 7, 1915 |
| 1,295,417 | Boerner | Feb. 25, 1919 |
| 1,368,753 | Redman et al. | Feb. 15, 1921 |
| 2,013,368 | Trusler | Sept. 3, 1935 |
| 2,069,746 | Andrews | Feb. 9, 1937 |
| 2,377,177 | Pfleumer | May 29, 1945 |
| 2,498,368 | Harrison | Feb. 21, 1950 |

FOREIGN PATENTS

| | | |
|---|---|---|
| 204,400 | Great Britain | Oct. 1, 1923 |